United States Patent
Lang et al.

(10) Patent No.: US 10,140,525 B2
(45) Date of Patent: Nov. 27, 2018

(54) SYSTEM AND METHOD FOR CAPTURING A REAR PART OF A VEHICLE

(71) Applicants: Werner Jürgen Lang, Ergersheim (DE); Johann Fellner, Dietenhofen (DE)

(72) Inventors: Werner Jürgen Lang, Ergersheim (DE); Johann Fellner, Dietenhofen (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 15/349,173

(22) Filed: Nov. 11, 2016

(65) Prior Publication Data
US 2017/0140228 A1   May 18, 2017

(30) Foreign Application Priority Data
Nov. 13, 2015   (DE) .................. 10 2015 014 799

(51) Int. Cl.
*G06K 9/00* (2006.01)
*B60R 1/00* (2006.01)
(Continued)

(52) U.S. Cl.
CPC ............. *G06K 9/00791* (2013.01); *B60R 1/00* (2013.01); *B60R 1/002* (2013.01); *B60R 1/007* (2013.01);
(Continued)

(58) Field of Classification Search
USPC ....... 382/100, 103–107, 120, 162, 168, 181, 382/199, 209, 216, 232, 254, 274, 276,
(Continued)

(56) References Cited

U.S. PATENT DOCUMENTS

| 2010/0070149 A1* | 3/2010 | Fry ................... B60T 8/1708 701/70 |
| 2012/0200064 A1* | 8/2012 | Gallego ............... B60D 1/155 280/446.1 |

(Continued)

FOREIGN PATENT DOCUMENTS

| DE | 29913557 | 12/1999 |
| DE | 102 27 616 | 7/2004 |

(Continued)

OTHER PUBLICATIONS

Office Action dated Feb. 22, 2018 which issued in the corresponding Russian Patent Application No. 2016144401.

(Continued)

*Primary Examiner* — Seyed Azarian
(74) *Attorney, Agent, or Firm* — Cozen O'Connor

(57) ABSTRACT

A system for a vehicle (13) having a driver's cabin (15) and a rearward extending portion (14) that is pivotable with respect to the driver's cabin (15), for capturing a rear part (17) of the rearward extending portion (14), the system having at least two wheel sensors (2, 3) located on opposite ends of an axis (18, 19) of the rearward extending portion (14), for acquiring information on a rotational movement of wheels attached to the ends of the axis (18, 19), and a control unit (4) connected with the wheel sensors (2, 3), which control unit determines the rear part (17) of the rearward extending portion (14) based on the acquired information on the rotational movement of the wheels.

15 Claims, 4 Drawing Sheets

(51) Int. Cl.
  *B60R 1/12*   (2006.01)
  *B62D 15/02*  (2006.01)
  *B60R 1/02*   (2006.01)
  *G08G 1/16*   (2006.01)
  *H04N 7/18*   (2006.01)

(52) U.S. Cl.
  CPC ............... *B60R 1/025* (2013.01); *B60R 1/12* (2013.01); *B62D 15/024* (2013.01); *B62D 15/0245* (2013.01); *G08G 1/167* (2013.01); *B60R 2001/1253* (2013.01); *B60R 2300/101* (2013.01); *B60R 2300/103* (2013.01); *B60R 2300/20* (2013.01); *B60R 2300/802* (2013.01); *B60R 2300/804* (2013.01); *B60R 2300/8086* (2013.01); *B60Y 2200/148* (2013.01); *B60Y 2400/92* (2013.01)

(58) Field of Classification Search
  USPC ............ 382/286–291, 305, 312; 701/70, 49; 348/148, 113; 280/446.1
  See application file for complete search history.

(56) References Cited

U.S. PATENT DOCUMENTS

| | | | | |
|---|---|---|---|---|
| 2012/0200706 | A1* | 8/2012 | Greenwood | ............ B60R 1/00 348/148 |
| 2014/0267689 | A1* | 9/2014 | Lavoie | ................... H04N 7/183 348/113 |
| 2014/0330487 | A1* | 11/2014 | Brandt | ................... B60R 1/025 701/49 |
| 2016/0167583 | A1 | 6/2016 | Schrepfer | |

FOREIGN PATENT DOCUMENTS

| | | |
|---|---|---|
| DE | 10333998 | 2/2005 |
| DE | 10 2004 036 089 | 2/2006 |
| DE | 102009032024 | 1/2011 |
| DE | 10 2011 003 791 | 8/2012 |
| DE | 10 2013 214 368 | 1/2015 |
| EP | 1529689 | 5/2005 |
| EP | 2479086 | 7/2012 |
| EP | 2786347 | 10/2014 |
| GB | 2356612 | 5/2001 |
| JP | 2014-533630 | 12/2014 |
| JP | 2016-137802 | 8/2016 |
| JP | 2016-530150 | 9/2016 |
| WO | WO 2013/079068 | 6/2013 |

OTHER PUBLICATIONS

Office Action dated Oct. 24, 2017 which issued in the corresponding Japanese Patent Application No. 2016-221174.

* cited by examiner

SYSTEM AND METHOD FOR CAPTURING A REAR PART OF A VEHICLE

BACKGROUND OF THE INVENTION

1. Field of the Invention

The invention relates to a system and method for capturing a rear part of a vehicle, in particular a commercial vehicle having a semitrailer, trailer, or any other rearward extending portion that is pivotable with respect to a driver's cabin, and whose rear part has to be captured.

2. Description of the Related Art

In vehicles with trailers, conventional vehicle mirror systems and camera-based mirror substitute systems, respectively, are used in order to ensure that the vehicle driver may sufficiently monitor the vehicle environment at any time, even if the trailer is aligned differently with respect to the vehicle, i.e. at different angles of the longitudinal axis of the vehicle with respect to the longitudinal axis of the trailer.

In vehicles with trailers, in particular the rear part of the trailer has to be displayed to a vehicle driver to support the driver, e.g. during maneuvering processes and driving along curves, as the trailer swings out relative to the driver's cabin in these driving situations.

Within the sense of the present teaching, the term trailer comprises trailers coupled to a vehicle (tractor unit) by means of a hitch, e.g. semitrailers (so-called trailers), which are disposed on the rear, lowered portion of a tractor unit, and are thus connected pivotally at least about a vertical axis. In general terms, a trailer is a rearward extending portion located behind the driver's cabin of a vehicle and laterally movable (pivotable) with regard to the driver's cabin, which portion pivots about a vertical axis when driving along curves.

DE 10 2013 214 368 A1 discloses the use of an image capturing unit and an image display unit serving as a mirror substitute system for monitoring and displaying a lateral and/or rear vehicle environment. It is, however, a disadvantage of this type of image capturing unit and image display unit, that an image captured by the image capturing unit has to be adapted by suitably choosing a corresponding image section, changing the image scale and/or changing the image resolution, such that the image of the vehicle environment shown on the displayed image portion is preferably not obscured or only slightly obscured by the trailer of the vehicle.

One disadvantage of using an image recognition device is that different contours of the trailer (e.g. Plane-Striegel, low-loader, silo trailers etc.) or low contours (e.g. at night, colors, fog, snow, etc.) complicate recognition.

SUMMARY OF THE INVENTION

It is an object of the invention to provide a system and method for a vehicle with trailer, wherein the rear part of the trailer can be reliably determined in order to ensure that the rear portion of the trailer can be displayed to the driver dependent on the respective driving situation at any time.

In particular, it is an object of the invention, to appropriately support a visual system for a vehicle with trailer, wherein, dependent on the driving situation, e.g. driving along curves or during turning maneuvers where the trailer swings out laterally with respect to the vehicle, the utilization of a predetermined limited display surface of a display unit for displaying the image portions relevant for the respective driving situation is improved.

The system according to the invention, for a vehicle having a driver's cabin and a rearward extending portion that is pivotable with respect to the driver's cabin, serves for capturing a rear part of the rearward extending portion and comprises at least two wheel sensors located at opposed ends of an axis of the rearward extending portion, where wheels are mounted. The wheel sensors, in particular, acquire information on a rotational movement of the wheels. The system according to the invention further comprises a control unit connected with wheel sensors, which control unit determines the rear part of the rearward extending portion based on the acquired information on the rotational movement of the wheels.

By using wheel sensors it is possible to assist an already existing view system used for determining the rear part of a trailer, so that the rear part of the trailer can reliably be determined even in case of bad view situation like rain, snow, fog, etc. The determined rear part of the trailer may for example be used for adjusting (optimizing) the displaying of the rear part of the trailer on a monitor having a limited display area.

In a preferred embodiment of the system, the control unit determines a bend angle and/or a bend direction of the driver's cabin with respect to the rearward extending portion based on the acquired information on the rotational movement of the wheels.

In another preferred embodiment, the control unit determines a circular arc, along which the vehicle moves, based on the acquired information on the rotational movement of the wheels, wherein the information on the rotational movement preferably includes information on the rotational speed and/or direction of rotation of the wheels.

In a further preferred embodiment, the system comprises two or more wheel sensors respectively located at opposed ends of an axis where the wheels, the rotational movement of which is to be acquired, are mounted. Preferably, a wheel sensor is attached to a wheel hub of the axis.

In a further preferred embodiment of the invention, the control unit is an ABS control device or EBS control device, which usually is already installed in a conventional vehicle. By integration with an existing ABS system, it is, for example, possibly to jointly use synergies (power supply, sensors, housing etc.) and to save costs. Here, the already existing sensors of these control devices may be used to gather information on the rotational movement of the wheels, additionally or as an alternative to the above-mentioned wheel sensors.

In a further preferred embodiment of the system according to the invention, the system comprises a system for indirect view, e.g. a mirror substitute system and/or a mirror system, for providing a field of view located outside the driver's cabin, which field of view preferably extends laterally rearward from the driver's cabin and includes at least part of the vehicle side and the rearward extending portion. Here, the control unit controls the system for indirect view based on the acquired information on the rotational movement of the wheels, in order to adapt (adjust) the field of view such that the rear part of the rearward extending portion is always located within the field of view. This ensures that, dependent on the driving situation (driving along curves, turning maneuvers, reversing, maneuvering procedures etc.), it is guaranteed that the relevant rear part of the rearward extending portion (trailer) is displayed to the vehicle driver at any time. Preferably, the display of the rear part is substantially undistorted and uncompressed, respectively.

In a further preferred embodiment of the system according to the invention, by means of adapting or changing the field of view, it is ensured that the rear part is always located within the field of view, by correspondingly shifting and/or extending the field of view.

In a further preferred embodiment of the system according to the invention, information including a vehicle geometry, a steering angle, a vehicle speed and/or additional vehicle signals is used in addition to the information on the rotational movement of the wheels in order to support determination of the rear part. In a preferred embodiment of the invention, the vehicle geometry may be acquired by a vehicle-mounted image recognition system, which system is preferably based on ultrasound. The vehicle geometry may also be acquired in advance and permanently stored in the system in advance. For example, following information (data) may be stored in advance in a memory: number of axes, number of trailers (rearward extending portions), number of axes for each trailer, length and width of the trailer and vehicle, respectively, center of rotation of the trailer, upper and lower edge of the trailer and or vehicle, etc.

A method according to the invention, for a vehicle having a driver's cabin and a rearward extending portion that is pivotable with respect to the driver's cabin, determines a rear part of the rearward extending portion by acquiring a first information on a rotational movement of a first wheel of the rearward extending portion, by acquiring a second information on a rotational movement of a second wheel of the rearward extending portion, wherein the first wheel and the second wheel are arranged opposite each other on the same axis, by calculating a difference between the first and second information on the rotational movement, and by determining the rear part of the rearward extending portion based on the difference between the first and the second information on the rotational movement.

In a preferred embodiment, when determining the rear part, the difference between the first and second information on the rotational movement is compared to a predetermined threshold value. This threshold value may, e.g. be stored in a lookup table of a memory in advance. In this manner, also a bend angle and/or bend direction of the driver's cabin with respect to the rearward extending portion may be determined.

In a further preferred embodiment, the method further comprises displaying a field of view, which is located outside the driver's cabin and extends rearward towards the rear part, as well as adapting the field of view such that the rear part of the rearward extending portion is always located within the field of view.

Here, adaption of the field of view comprises shifting and/or extending the field of view, and is carried out in real time, so that the driver of the vehicle is supported when driving, dependent on the driving situation.

In a further preferred embodiment, the method comprises a further step for receiving information on the vehicle geometry, a steering angle, a vehicle speed and/or additional vehicle signals, wherein determining the rear part of the rearward extending portion is based on this information, in addition to the information on the rotational movement of the wheels.

In a preferred embodiment of the invention, the method comprises determining whether the rear part is within the field of view, wherein, if the rear part is not within the field of view, the field of view is adapted by shifting and/or extending the field of view, and displaying the adapted field of view on a mirror substitute system and/or a mirror system, so that a vehicle driver may monitor the rear part of the rearward extending portion at any time. A mirror substitute system and/or mirror system of this type is preferably located at the driver's cabin and is readily visible for the vehicle driver.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described by means of the attached figures, wherein same reference numerals in the figures designate same parts. The Figures show.

DETAILED DESCRIPTION OF THE PRESENTLY PREFERRED EMBODIMENTS

Figure 1:
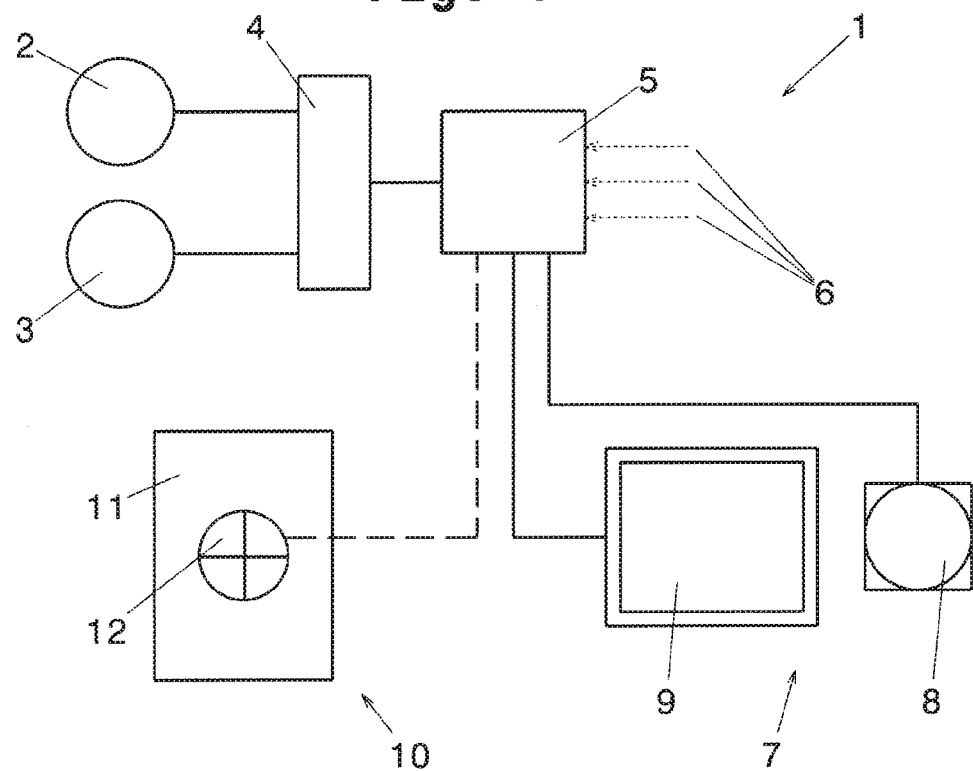
FIG. 1 a schematic view of a system for a vehicle according to a preferred embodiment.

FIG. 1 shows a schematic top view of a system 1 for a vehicle, which system acquires a rear part of a vehicle trailer, according to a preferred embodiment of the invention.

The system 1 comprises two wheel sensors 2, 3, which are located at opposed ends of a trailer axis, where also the wheels are mounted. The wheel sensors 2, 3 are, for example, sensors for acquiring information on a rotational movement of the wheels, in particular for acquiring a rotational speed and/or a direction of rotation of the wheels.

The information acquired by the wheel sensors 2, 3 is supplied to a control unit 4, which is electrically connected to the wheel sensors 2, 3 and processes the acquired information in order to determine the rear part of the trailer, a bend angle and/or a bend direction of the vehicle with respect to the trailer. This determination is, in particular, based on an acquired rotational speed difference between a wheel on the left side of the trailer, where the wheel sensor 2 is attached, and a wheel on the right side of the trailer, where the other wheel sensor 3 is attached.

As shown in FIG. 1, the control unit 4 is connected with a processing unit 5 that receives information (control information) from the control unit, which information is based on processing of the information from the wheel sensors 2, 3.

As shown in FIG. 1, the processing unit 5 may additionally receive one or more vehicle signals 6 as, for example, signals from an indicator, a reverse gear, CAN data, a speed signal, braking signal etc.

Although the control unit 4 and the processing unit 5 are shown as separate parts in FIG. 1, the control unit 4 and the processing unit 5 may also be integrated with each other as a single unit. In particular, the control unit 4 and/or the processing unit 5 may be part of an existing ABS control device and/or EBS control device, wherein in this case, the sensors existing therein may be used as wheel sensors 2, 3.

As shown in FIG. 1, the processing unit 5 further serves to receive information from a system 7 for indirect view. According to the preferred embodiment, the system 7 for indirect view shown in FIG. 1 comprises a capturing unit 8 as well as a display unit 9.

According to the preferred embodiment, the capturing unit 8 is a camera and the display unit 9 is a monitor. The camera is, for example, be a conventional black and white camera, color camera, infrared camera, ultrasonic camera, etc.

According to a preferred embodiment, the capturing unit 8 as shown in FIG. 1 is further able to acquire the vehicle geometry, e.g. dimensions of the tractor unit and the trailer, respectively, entire length, distance of the system 7 for indirect view with regard to the rear vehicle edge of the trailer, etc. In particular, the capturing unit 8 may use image recognition for optical recognition of the vehicle geometry.

As shown in FIG. 1, the capturing unit 8 and the display unit 9 are electrically connected with the processing unit 5, so that the latter is able to receive and process information from the capturing unit 8 in addition to the vehicle signals 6 and the control information from the control unit 4, and to display the vehicle driver a correspondingly processed image on the display unit 9.

According to the preferred embodiment, in particular the rear part of the vehicle trailer is displayed in the display unit 9. The display unit 9 may, for example, be located in the driver's cabin, so that the driver may readily and immediately view the rear part of the trailer, which is displayed on the display unit 9. Alternatively, the display unit 9 may be used as side mirror substitute and attached at a position where usually a side mirror is mounted.

As shown in FIG. 1, the system 1 according to the preferred embodiment further comprises a mirror system 10 with a mirror glass 11 and an adjustment gear 12. By means of the adjustment gear 12, the mirror glass 11 can be appropriately moved in order to change the field of view displayed on the mirror glass 11.

The mirror system 10 is electrically connected with the processing unit 5, wherein the processing unit 5 may, in particular, control the adjustment gear 12, in order to move the mirror glass 11 such that the field of view displayed on the mirror glass 11 always shows the rear part of the trailer.

Thus, based on the information received by the wheel sensors 2, 3 and, where appropriate, based on additionally received vehicle signals 6, the system 1 according to the invention is able to adjust the mirror glass 11 such that, during a maneuvering process, a parking process, turning to the left, turning to the right etc., the rear part of the trailer is always located within the field of view displayed on the mirror glass 11.

Similar to the mirror system 10, the capturing unit 8 of the system 7 for indirect view shown in FIG. 1 may be adjusted such that, based on the information acquired by the wheel sensors 2, 3 and, where appropriate, based on the additionally received vehicle signals, the rear part of the trailer is always displayed on the display unit 9.

Although FIG. 1 shows both a system 7 for indirect view and a mirror system 10, as an alternative, it is also possible to only use one of these systems.

Further, the mirror system 10 preferably is a mirror system substituting the side mirror at the driver's cabin to reliably display a rearward extending field of view (extending towards a rear part of the trailer) to the driver.

Figure 2:
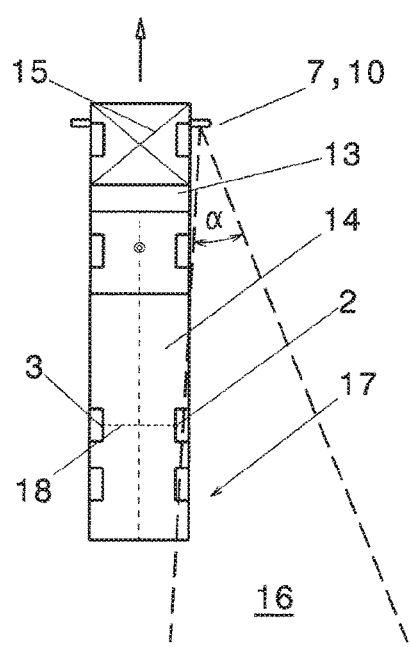
FIG. 2 a top view of a commercial vehicle with trailer, which vehicle uses the system according to the invention, in a first driving situation.

FIG. 2 shows a top view of a vehicle 13 comprising the system 1 shown in FIG. 1.

As shown in FIG. 2, the vehicle 13 comprises a rearward extending portion 14, which is formed as a trailer in this embodiment.

As shown in FIG. 2, a driver's cabin 15 of the vehicle 13 comprises the system 7 for indirect view and/or the mirror system 10. In particular, the mirror system 10 and the system 7 for indirect view, respectively, are formed as side mirror in order to display a rearward extending field of view 16 to the driver of the vehicle 13.

As shown in FIG. 2, the field of view 16 extends in the direction of the rearward extending portion 14 of the vehicle, wherein in particular a rear part 17 is located within the field of view 16.

FIG. 2 shows a driving situation where the vehicle drives straight ahead, i.e. where a longitudinal axis of the driver's cabin 15 coincides with the longitudinal axis of the rearward extending portion 14 to form a straight line.

As shown in FIG. 2, wheel sensors 2 and 3, respectively, are mounted on a rear axis 18 of the rearward extending portion 14 on opposed sides (i.e. on the left and on the right of the trailer). According to the preferred embodiment, the wheel sensors 2, 3 are specifically attached to the wheel hub. As an alternative, it is also possible to attach the wheel sensors directly to the wheels, whereby it has to be ensured that at least one rotational speed and direction of rotation, respectively, of the wheel can be acquired. Although only two wheel sensors are shown, also more than two wheel sensors may be used.

Figure 3:
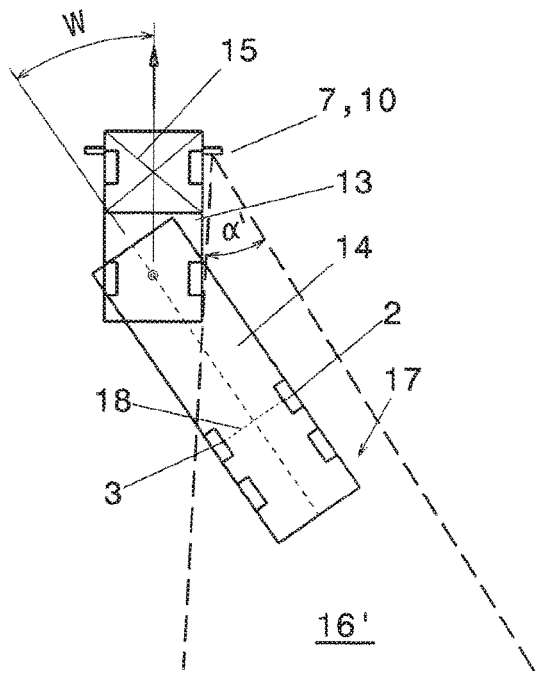
FIG. 3 a top view of the commercial vehicle according to FIG. 2 in a second driving situation.

FIG. 3 shows a top view of the vehicle 13 according to FIG. 2 in a driving situation that corresponds, for example, to a turning process. In such a driving situation, the rearward extending section 14 swings out laterally, so that an angle W is formed between the longitudinal axis of the vehicle 13 and the rearward extending portion. This bend angle W may be determined by means of the wheel sensors 2, 3, based on a rotational speed difference of the wheels.

According to FIG. 2, the rotational speeds acquired by the wheel sensors 2, 3 equal each other, as the vehicle 13 drives straight ahead, whereas in the driving situation according to FIG. 3, the rotational speed acquired by wheel sensor 3 is higher than the rotational speed acquired by wheel sensor 2, as a circular arc along which the wheel sensor 3 moves when driving along the curve is longer than a circular arc along which the wheel sensor 2 moves when driving along this curve.

When knowing the rotational speed difference obtained by wheel sensors (not shown) attached on opposing ends of one or more axes of the vehicle 13 and/or the rearward extending portion 14 (trailer) it is possible to calculate the bend angle. The more information regarding geometry of the vehicle 13 and the rearward extending portion 14 is available, the more precise such calculation will be.

In particular, information regarding length and width of the vehicle 13 and the rearward extending portion 14, information regarding the distance between wheel sensors on an axis, the rotational center between the vehicle 13 and the rearward extending portion 14, vehicle speed, forward or rearward driving, etc. may be used for improving accuracy of the calculation of the bend angle W and as a consequence, of capturing the rear part 17 of the vehicle.

In this way, the control unit 4 according to FIG. 1 may both determine the rear part 17 of the rearward extending portion 14 and a bend angle or bend direction, respectively, of the driver's cabin 15 with respect to the rearward extending portion 14.

As shown in FIG. 3, in such a driving situation, the rear part 17 of the rearward extending portion 14 will swing out of the field of view 16 according to FIG. 2, so that without adapting the field of view 16 according to FIG. 2, a vehicle driver is not able to view said rear part 17 on the system 7 for indirect view and the mirror system 10, respectively.

However, since the rear part 17 may be determined based on information on the rotational movement of the wheels, as described above, it is possible to control the system 7 for indirect sight and the mirror system 10, respectively, such in this driving situation, that the field of view 16 according to FIG. 2 is extended in order to ensure that the rear part 17 is located within the field of view 16' as shown in FIG. 3. Thus, the angle α' of the field of view 16' according to FIG. 3 is larger than the angle α of the field of view 16 according to FIG. 2.

Figure 4:
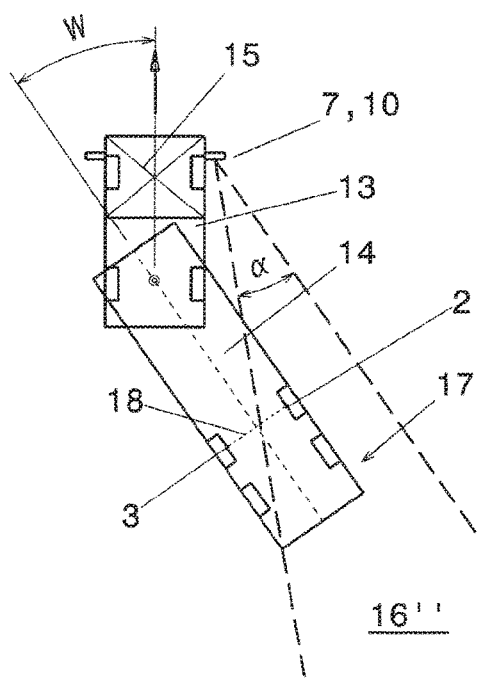
FIG. 4 a top view of the commercial vehicle according to FIG. 2 in the driving situation according to FIG. 3.

FIG. 4 shows the same driving situation of the vehicle 13 as shown in FIG. 3, wherein, contrary to FIG. 3, the field of view 16 according to FIG. 2 is not extended but shifted, so that the rear part 17 of the rearward extending portion 14 can be displayed to the driver by means of the system 17 for indirect view and the mirror system 10, respectively.

Thus, the field of view 16" as illustrated in FIG. 4 shows the same angle α as the field of view 16 according to FIG. 2. By shifting the field of view in this manner, substantially only the rear part 17 of the rearward extending portion 14 is displayed to a driver, contrary to the extension of the field of view 16' according to FIG. 3, where substantially the entire rearward extending portion 14, including the rear part 17, is displayed.

Figure 5:
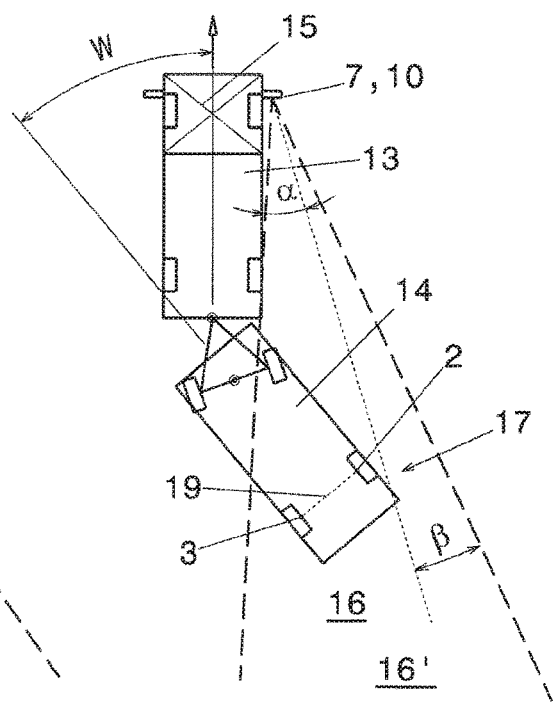
FIG. 5 a top view of a commercial vehicle with trailer, which vehicle uses the system according to the invention, in the driving situation according to FIG. 3.

FIG. 5 shows a top view of a vehicle 13 having a rearward extending separate portion 14 in the same driving situation as in FIGS. 3 and 4.

Contrary to FIGS. 3 and 4, FIG. 5 shows the wheel sensors 2, 3 which are located at opposed ends of an axis 19, wherein, unlike in FIGS. 2 to 4, the axis 19 is the rearmost axis of the rearward extending portion 14. In this manner, the rear part 17 may be brought closer to the rear edge of the rearward extending portion 14.

Similar as in FIG. 3, in the embodiment according to FIG. 5, the rear part 17 of the rearward extending portion 14 is determined by means of the wheel sensors 2, 3, and the field of view displayed by the system 7 for indirect view and the mirror system 10, respectively, is correspondingly updated (tracked). In the embodiment according to FIG. 5, the field of view 16 according to FIG. 2 is extended by an angle β, similar as in FIG. 3. According to the preferred embodiment of FIG. 5, the field of view 16' therefore corresponds to the field of view 16' according to FIG. 3, wherein the angle α' according to FIG. 3 corresponds to the sum of the angles α and β according to FIG. 5.

Figure 6:
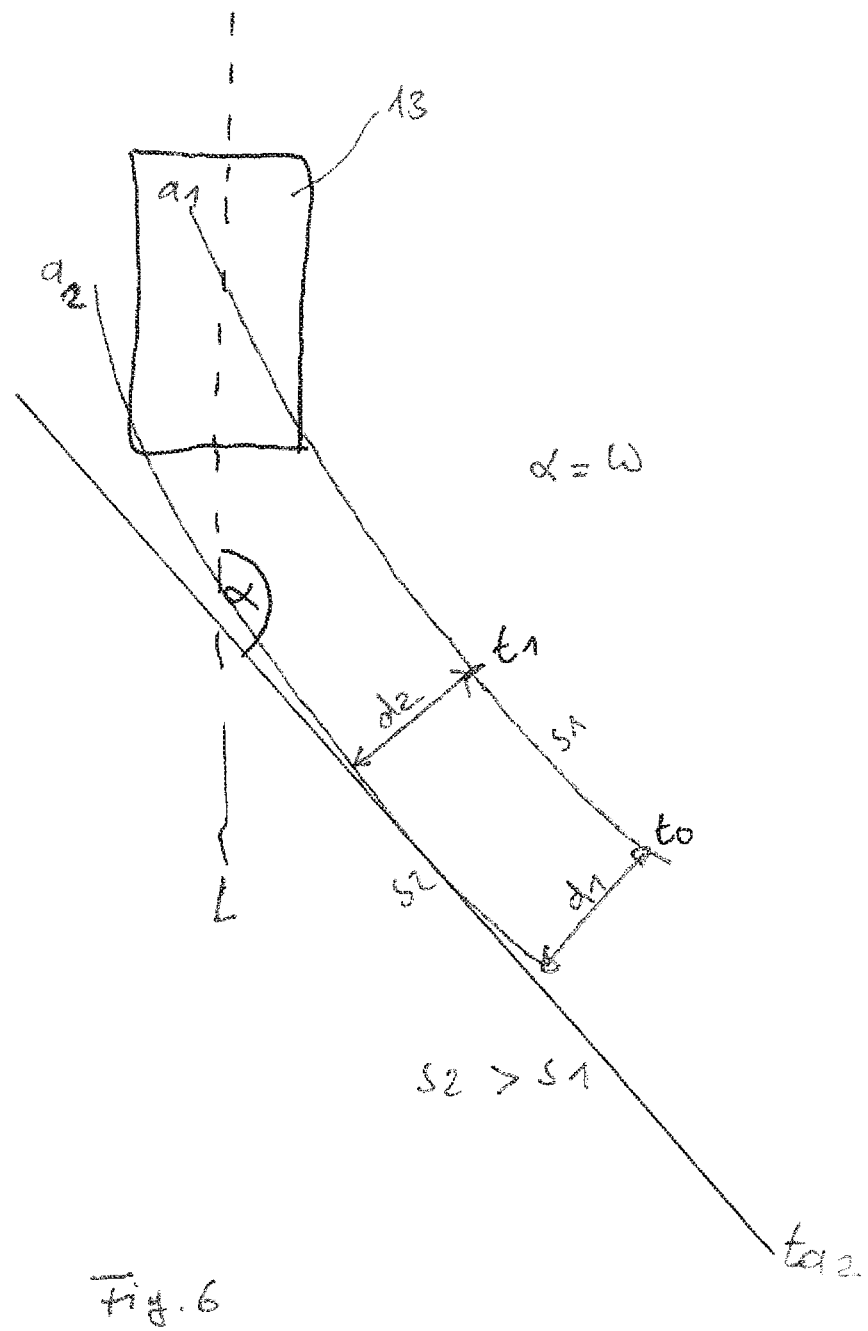
FIG. 6 a schematic view of parts of circular arcs on which wheels of the commercial vehicle and of the trailer move during the second driving situation of FIGS. 3 and 4 for determining a bend angel W.

FIG. 6 shows a schematic view of parts of circular arcs a1, a2 on which wheels of the commercial vehicle and of the trailer move during the second driving situation of FIGS. 3 and 4 for determining a bend angel W.

As shown in FIG. 6, the wheels (not shown) move on circular arcs a1, a2 during this driving situation. In particular, the wheels on the right side of the rearward extending portion 14 (trailer) move on the circular arc a1, whereas the wheels on the left side of the rearward extending portion 14 move on the circular arc a2. As shown in FIG. 6, during a time period t0-t1, the wheels on the left and right side of the rearward extending portion 14 move a distance s1, s2, respectively.

As shown in FIG. 6, when determining a tangent ta2 of the circular arc a2, for example, in this driving situation shown in FIG. 6, a bend angle W may be calculated as an angle between the longitudinal axis of the vehicle 13 and the tangent tat, for example. Alternatively or in addition, a tangent (not shown) of the circular arc a1 may be used for calculating the bend angel.

Figure 7:
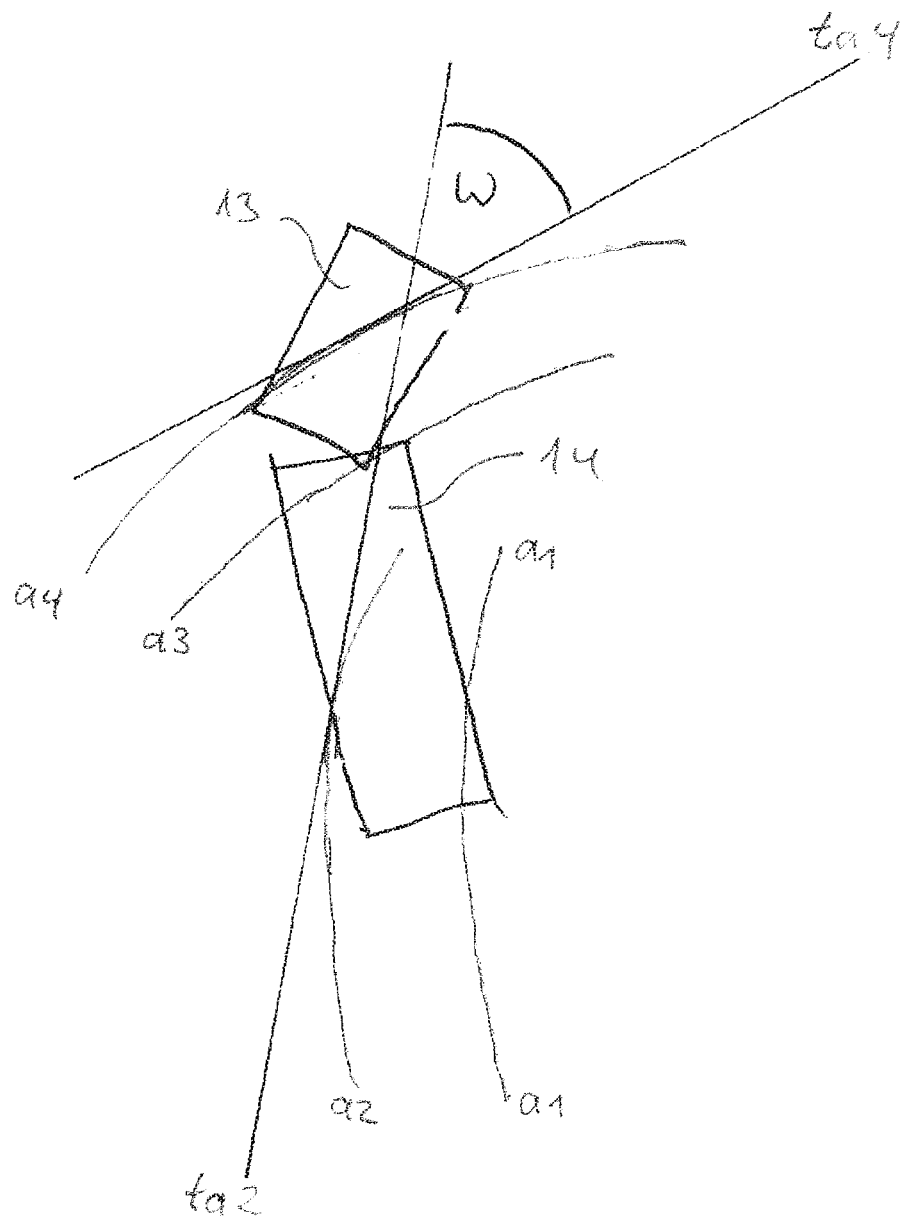
FIG. 7 a schematic view of parts of circular arcs on which wheels of the commercial vehicle and of the trailer move during the second driving situation of FIGS. 3 and 4 according to an alternative for determining the bend angle W.

FIG. 7 shows a schematic view of parts of circular arcs on which wheels of the commercial vehicle and of the trailer move during the second driving situation of FIGS. 3 and 4 for determining a bend angel W.

As shown in FIG. 7, similar to FIG. 6, circular arcs a1, a2 are determined on which wheels of the rearward extending portion 14 move. In addition, circular arcs a3, a4 are determined on which wheels of the vehicle 13 move. For example, an angle between a tangent ta4 of the circular arc a4 and a tangent ta2 of the circular arc a2 may be used as corresponding to the bend angle W.

Alternatively or in addition, an angle between a tangent (not shown) of the circular arc a3 and a tangent (not shown) of the circular arc a1 may be used for calculating the bend angle W.

In particular, the bend angle between the vehicle 13 and the trailer 14 is determined by analyzing at least two wheel sensors of the vehicle and/or trailer provided on opposite sides on an axis and by considering additional data provided by additional sensors, for examples, speed, travel direction, forward/rearward travelling, and considering additional information of the geometry of the vehicle and/or trailer acquired in real-time or stored in advance. As mentioned above, the more information and data is used, the more precise the bend angle determination is.

By using at least a part of the above mentioned data and information, an ECU already provided in the vehicle, for example, is able to calculate the bend angle between vehicle and trailer by using a mathematical model.

Further, by using the calculated bend angle, it is possible to capture the rear part of the trailer and to adjust the view of a mirror substitution system or camera based monitoring system providing always the best view of the rear part of the trailer to a driver.

Although the above embodiments particularly show a driving situation that corresponds to a turning operation, it is also possible in various other driving situations, e.g. reversing, maneuvering, driving along curves etc., to determine the rear part of a rearward extending portion (trailer) according to the invention, based on the rotational information on the wheels, which information is provided by wheel sensors, in order to appropriately change and adapt the field of view that is displayed to a vehicle driver by means of the system for indirect view and the mirror system, respectively. This adaption (adjustment) by means of shifting and extending, respectively, the field of view may take place in real time while driving. This ensures that the rear part is always in the field of view of the vehicle driver in a substantially undistorted (uncompressed) manner, thus allowing safe driving.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for a vehicle having a driver's cabin and a rearward extending portion that is pivotable with respect to the driver's cabin, for capturing a location of a rear part of the rearward extending portion, the system comprising
    at least two wheel sensors, two of the at least two wheel sensors being located at opposite ends of a common axis of the rearward extending portion for acquiring information relating to a rotational movement of wheels attached at the ends of the common axis;
    a control unit in communication with the wheel sensors, the control unit determining an alignment of the rear part of the rearward extending portion based only on the acquired information relating to the rotational movement of the wheels from the two wheel sensors which are located at opposite ends of the common axis; and
    an indicator viewable from the driver's cabin, the indicator being adjusted based on the determination of the control unit to ensure that the rear part of the rearward extending portion is viewable from the driver's cabin,
    wherein the indicator comprises a system for indirect view for providing a field of view of an area which is located outside the driver's cabin, wherein the control unit controls the system for indirect view based on the acquired information on the rotational movement of the wheels in order to adapt the field of view such that the rear part of the rearward extending portion is always located within the field of view.

2. The system according to claim 1, wherein the control unit determines a bend angle and a bend direction of the driver's cabin with respect to the rearward extending portion based on the acquired information on the rotational movement of the wheels.

3. The system according to claim 1, wherein the control unit determines a circular arc along which the vehicle moves, based on the acquired information on the rotational movement of the wheels.

4. The system according to claim 1, wherein the information on the rotational movement includes at least one selected from the group of: the rotational speed and the direction of rotation.

5. The system according to claim 1, wherein additional ones of the at least two wheel sensors are provided on at least one additional axis.

6. The system according to claim 1, wherein the wheel sensor is attached to a wheel hub.

7. The system according to claim 1, wherein the control unit is an ABS control device or EBS control device.

8. The system according to claim 1, wherein the system for indirect view is at least one selected from the group of: a mirror substitute system and a mirror system.

9. The system according to claim 1, wherein determination of the rear part is further based on at least one selected from the group of: a vehicle geometry, a steering angle, a vehicle speed, and additional vehicle signals.

10. The system according to claim 9, wherein the vehicle geometry is acquired by an image recognition system mounted to the vehicle, or stored in the system in advance.

11. The system according to claim 10, wherein the image recognition system is based on ultrasound.

12. A method for a vehicle having a driver's cabin and a rearward extending portion that is pivotable with respect to the driver's cabin, for capturing a location of a rear part of the rearward extending portion, the method comprising;
    measuring a first information on a rotational movement of a first wheel of the backward extending portion;
    measuring a second information on a rotational movement of a second wheel of the backward extending portion, wherein the first wheel and the second wheel are located opposite each other on a common axis;
    calculating a difference between the first and the second information on the rotational movement;
    determining an alignment of the rear part of the rearward extending portion based only on the difference between the first and the second information on the rotational movement;
    adjusting an indicator viewable from the driver's cabin based on the determining to ensure that the rear part of the rearward extending portion is viewable from the driver's cabin;
    displaying a field of view of an area which is located outside the driver's cabin; and
    adapting the field of view such that the rear part of the rearward extending portion is always located within the field of view.

13. The method of claim 12, wherein the step of determining the alignment of the rear part comprises:
    comparing the difference between the first and the second information on the rotational movement with a predetermined threshold value for performing at least one selected from the group of: (a) determining the alignment of the rear part, and (b) determining a bend angle and a bend direction of the driver's cabin with respect to the rearward extending portion.

14. The method according to claim 12, further comprising
    receiving information on at least one selected from the group of: the vehicle geometry, a steering angle, a vehicle speed, and additional vehicle signals; and
    determining the alignment of the rear part of the rearward extending portion based on at least one selected from the group of: the information on the vehicle geometry, the steering angle, the vehicle speed, and the additional vehicle signals.

15. The method according to claim 12, wherein the indicator comprises at least one selected from the group of: a mirror substitute system and a mirror system, the method further comprising:
    determining whether the rear part is located within the field of view,
    adapting the field of view if it is determined that the rear part is not located within the field of view, by performing at least one selected from the group of: shifting and extending the field of view, and displaying the adapted field of view on at least one selected from the group of: the mirror substitute system and the mirror system.

* * * * *